United States Patent [19]

Friend et al.

[11] Patent Number: 5,110,693
[45] Date of Patent: May 5, 1992

[54] ELECTROCHEMICAL CELL

[75] Inventors: Stephen O. Friend, Boxford; Jaspard H. Atkins, Westwood, both of Mass.; Howard G. Tennent, Kennett Square, Pa.; Robert Hausslein, Lexington, Mass.

[73] Assignee: Hyperion Catalysis International, Lexington, Mass.

[21] Appl. No.: 602,446

[22] Filed: Oct. 23, 1990

Related U.S. Application Data

[63] Continuation of Ser. No. 413,838, Sep. 28, 1989, abandoned.

[51] Int. Cl.$^5$ .............................................. H01M 4/96
[52] U.S. Cl. ......................................... 429/40; 429/27
[58] Field of Search .................................... 429/27, 40

[56] References Cited

U.S. PATENT DOCUMENTS

| | | |
|---|---|---|
| 3,964,933 | 6/1976 | Fung et al. |
| 4,136,213 | 1/1979 | Fung et al. ........................... 427/122 |
| 4,560,443 | 12/1985 | Folier ................................... 204/283 |
| 4,663,230 | 5/1987 | Tennent ............................... 428/367 |
| 4,759,980 | 7/1988 | Abe et al. .............................. 428/408 |
| 4,814,307 | 3/1989 | Funabashi et al. ............... 429/40 X |
| 4,816,289 | 3/1989 | Komatsu et al. .................. 423/447.3 |

FOREIGN PATENT DOCUMENTS

| | | |
|---|---|---|
| 0198558 | 4/1986 | European Pat. Off. |
| 63-282313 | of 1988 | Japan |
| 8707559 | 12/1987 | PCT Int'l Appl. |

OTHER PUBLICATIONS

Japanese Kokai 62/276080 (abstract only) 11/87.
Japanese Kokai 62/276082 (abstract only) 11/87.
Endo, Chemtech, "Grow Carbon Fibers in the Vapor Phase", pp. 568-576 (9/88).
Endo et al., (abstract), "Li Secondary Battery Using Highly Ordered Graphite Fiber Electrode", MRS meeting, pp. 157-160 (Fall-1988).
Tibbetts et al., SAMPE Journal, "Carbon Fibers Grown from the Vapor Phase: A Novel Material", pp. 30-35 (Sep./Oct.-1986).
JP61119716, Abstract, "Gas-Phase Carbon Fibre Suitable As Catalyst Base Or As Electrode For Fuel Cell" (6/6/86).
Kinoshita, Carbon, "Electrochemical and Physicochemical Properties", Chpt. 7, Application of Carbon in Electrochemical Systems, pp. 397-411 (1988, Wiley-Interscience publication).
Linden, *Handbook of Batteries and Fuel Cells*, pp. 1-3--1-12, 5-5 (McGraw-Hill 1984).

*Primary Examiner*—Stephen Kalafut

[57] ABSTRACT

An improved electrochemical cell that includes a catalytic electrode on which an electrochemical reaction occurs into which is incorporated an amount of electrically conductive carbon microfibers having diameters less than or equal to 0.1 micron sufficient to enhance the electrical conductivity of the electrode.

10 Claims, No Drawings

ELECTROCHEMICAL CELL

This is a continuation of copending application Ser. No. 07/413,838 filed on Sep. 28, 1989 now abandoned.

BACKGROUND OF THE INVENTION

This invention relates to electrochemical cells.

Fuel cells are a type of electrochemical cell in which the cathodic and anodic reactants are fed to the cell from an external source during operation, rather than being permanently contained within the cell. The reactants contact electrodes which catalyze the reduction of the cathodic reactant and the oxidation of the anodic reactant; the electrodes themselves are not consumed in the reaction. The electrodes also collect the current generated as a result of the electrochemical oxidation and reduction reactions.

Metal-air cells are similar to fuel cells except that only the cathodic reactant is fed to the cell. The anodic reactant is a metal which forms a permanent part of the cell.

Carbon microfibers are fibers having diameters less than 1 micron. Microfibers having diameters less than 0.5 micron are referred to as fibrils.

SUMMARY OF THE INVENTION

In general, the invention features an improved electrochemical cell that includes a catalytic electrode on which an electrochemical reaction occurs into which is incorporated an amount of electrically conductive carbon microfibers having diameters less than or equal to 0.1 micron sufficient to enhance the electrical conductivity of the electrode.

In preferred embodiments, the electrochemical cell is a fuel cell (e.g., a hydrogen/oxygen fuel cell) or a metal-air cell (e.g., in which the metal is zinc).

Preferred microfibers have length to diameter ratios of at least 5. Even more preferred are carbon microfibers that are tubes having graphitic layers that are substantially parallel to the microfiber axis and diameters between 3.5 and 75 nanometers, inclusive, as described in Tennent, U.S. Pat. No. 4,663,230 ("Carbon Fibrils, Method for Producing Same and Compositions Containing Same"), Tennent et al., U.S. Ser. No. 871,676 filed Jun. 6, 1986 ("Novel Carbon Fibrils, Method for Producing Same and Compositions Containing Same"), Tennent et al., U.S. Ser. No. 871,675 filed Jun. 6, 1986 ("Novel Carbon Fibrils, Method for Producing Same and Encapsulated Catalyst"), Snyder et al., U.S. Ser. No. 149,573 filed Jan. 28, 1988 ("Carbon Fibrils"), Mandeville et al., U.S. Ser. No. 285,817 filed Dec. 16, 1988 ("Fibrils"), and McCarthy et al., U.S. Ser. No. 351,967 filed May 15, 1989 ("Surface Treatment of Carbon Microfibers"), all of which are assigned to the same assignee as the present application and are hereby incorporated by reference. One aspect of substantial parallelism is that the projection of the graphite layers on the microfiber axis extends for a relatively long distance in terms of the external diameter of the microfiber (e.g., at least two microfiber diameters, preferably at least five diameters), as described in Snyder et al., U.S. Ser. No. 149,573. These microfibers preferably are also substantially free of a continuous thermal carbon overcoat (i.e. pyrolytically deposited carbon resulting from thermal cracking of the gas feed used to prepare the microfibers). These microfibers also are preferably in the form of aggregates in which individual microfibers are randomly entangled with each other or oriented substantially parallel to each other.

Incorporating small diameter carbon microfibers in one o both of the catalytic electrodes enables the electrode to collect current efficiently. The microfibers also increase the surface area of the electrode.

Other features and advantages of the invention will be apparent from the following description of the preferred embodiments thereof, and from the claims.

DESCRIPTION OF THE PREFERRED EMBODIMENTS

We now describe preferred embodiments of the invention.

Carbon microfibers having diameters less than or equal to 0.1 μm are suitable for incorporation in the catalytic electrodes of a wide variety of fuel cells and metal air cells. Examples of such cells are described in *Handbook of Batteries and Fuel Cells*, ed. David Linden, ch. 1, p. 10. They include zinc/oxygen (air) cells and hydrogen/oxygen cells. The particular material for the catalytic electrode is chosen based upon the reactants, as one of ordinary skill in the art will readily appreciate. In the case of the zinc/oxygen and hydrogen/oxygen cells, the preferred catalytic material is platinum. The cells are prepared using conventional fabrication techniques.

The carbon microfibers exhibit high electronic conductivity, good corrosion resistance in alkaline and acidic environments, and high accessible surface area. In the fuel cell, they act as a support for the catalytic material (holding it in place and making it accessible to the gaseous reactant) and as a current collector. In the latter application, they increase the electrical conductivity of the electrode by forming an effective electrically conductive network throughout the catalytic electrode material. Preferred microfibers are carbon fibrils having small diameters (preferably between about 3.5 and 75 nanometers), length to diameter ratios of at least 5, and graphitic layers that are substantially parallel to the fibril axis that are also substantially free of a continuous thermal carbon overcoat, as described in Tennent, U.S. Pat. No. 4,663,230; Tennent et al., U.S. Ser. No. 871,676; Tennent et al., U.S. Ser. No. 871,675; Snyder et al., U.S. Ser. No. 149,573; and Mandeville et al., U.S. Ser. No. 285,817. The fibrils may also be treated to introduce oxygen-containing functional groups onto the fibril surface, as described in McCarthy et al., U.S. Ser. No. 351,967, or milled, e.g., by mechanical milling (using a ball or stirred ball mill) or by chemical milling (using chemical reagents such as those described in the aforementioned McCarthy application) to decrease the size of fibril aggregates and the lengths of individual fibers.

When produced in useful quantities, the fibrils are in the form of aggregates of individual fibrils. For example, the process described in Snyder et al., U.S. Ser. No. 149,573 yields aggregates of randomly entangled fibrils resembling bird nests. A second type of aggregate consists of clusters of individual fibrils in which the fibrils are oriented substantially parallel to each other, giving the aggregate the appearance of combed yarn. The lengths and diameters of fibrils in each cluster are essentially uniform, although they may vary from cluster to cluster. These aggregates, and a method for making them, are described in Moy, U.S. Ser. No. 07/413,837 entitled "Fibril Aggregates and Method for Making Same" filed concurrently with the present application and assigned to the same assignee as the present application which is hereby incorporated by reference in its entirety.

The substantially parallel graphitic layers of the individual fibrils and small diameters are desirable because they enhance electrical conductivity. The lack of a continuous thermal carbon overcoat leads to enhanced electrical conductivity and oxidation resistance.

Other embodiments are within the following claims.

We claim:

1. In an electrochemical cell comprising a catalytic electrode on which an electrochemical reaction occurs, the improvement wherein carbon microfibers in the form of microfiber aggregates in which individual microfibers have diameters less than or equal to 0.1 micron are incorporated in said electrode in an amount sufficient to enhance the electrical conductivity of said electrode.

2. The electrochemical cell of claim 1 wherein the length to diameter ratio of said microfibers is at least 5.

3. The electrochemical cell of claim 1 wherein said microfibers comprise tubes having graphitic layers that are substantially parallel to the microfiber axis and diameters between 3.5 and 75 nanometers, inclusive.

4. The electrochemical cell of claim 3 wherein said microfibers are substantially free of a continuous thermal carbon overcoat.

5. The electrochemical cell of claim 3 wherein said microfibers are in the form of aggregates in which individual microfibers are randomly entangled with each other.

6. The electrochemical cell of claim 3 wherein said microfibers are in the form of aggregates in which individual microfibers are oriented substantially parallel to each other.

7. The electrochemical cell of claim 1 wherein said cell is a fuel cell.

8. The electrochemical cell of claim 7 wherein said fuel cell is a hydrogen/oxygen fuel cell.

9. The electrochemical cell of claim 1 wherein said cell is a metal-air cell.

10. The electrochemical cell of claim 9 wherein said meta is zinc.

* * * * *